(12) United States Patent
Fuchser et al.

(10) Patent No.: US 7,015,858 B2
(45) Date of Patent: Mar. 21, 2006

(54) ANTIJAM MODULE

(75) Inventors: Troy D. Fuchser, Tucson, AZ (US); William F. Dixon, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/726,978

(22) Filed: Dec. 3, 2003

(65) Prior Publication Data

US 2005/0122263 A1    Jun. 9, 2005

(51) Int. Cl.
*H01Q 3/02* (2006.01)
(52) U.S. Cl. .................................... 342/374; 455/277.1
(58) Field of Classification Search .................. 342/16, 342/362, 372, 374; 455/83, 277.1, 278.1
See application file for complete search history.

(56) References Cited

U.S. PATENT DOCUMENTS

| | | | |
|---|---|---|---|
| 3,798,548 A * | 3/1974 | White et al. ................. | 725/150 |
| 4,499,602 A * | 2/1985 | Hermeling et al. ......... | 455/180.3 |
| 5,483,685 A * | 1/1996 | Okamura .................... | 455/179.1 |
| 5,712,641 A | 1/1998 | Casabona | |
| 5,878,350 A * | 3/1999 | Nakamura et al. .......... | 455/442 |
| 6,044,252 A * | 3/2000 | Dorenbosch ............. | 455/161.1 |
| 6,493,546 B1 * | 12/2002 | Patsiokas .................. | 455/277.1 |
| 6,680,660 B1 * | 1/2004 | Nguyen ..................... | 333/133 |

FOREIGN PATENT DOCUMENTS

EP         1 276 251 A     1/2003

* cited by examiner

*Primary Examiner*—Dao Phan
(74) *Attorney, Agent, or Firm*—Thomas J. Finn; Leonard A. Alkov; Karl A. Vick

(57) ABSTRACT

An antijam module (10) for GPS utilizing the vertical and horizontal polarizations of signal output by each antenna element in an array of antenna elements. This effectively doubles the number of channels from the conventional number of channels (N) to 2N. Each of these channels is uniquely weighted in accordance with conventional teachings such that the system operates with a capability to null 2N−1 jammers. Another aspect of the invention is the provision of a system and method for moving the reference channel from one channel to another in respect to the detection of received power levels. In specific implementations, the applied weights are dithered in a predetermined direction and a predetermined amount to ascertain when and whether to pass the reference channel designation.

7 Claims, 9 Drawing Sheets

ANTIJAM MODULE

BACKGROUND OF THE INVENTION

1. Field of the Invention

The present invention relates to electrical and electronic circuits and systems. More specifically, the present invention relates to systems and methods for receiving GPS (Global Positioning Systems) and other radio frequency signals.

2. Description of Related Art

In GPS signal reception, the signal at the antenna is at very low levels. In fact for most normal GPS antennas, the received signal, being a spread spectrum signal, is significantly below the thermal noise level in a receiver front end.

Further, to implement a low cost controlled reception pattern antenna (CRPA) with conventional teachings, one of the major cost drivers is the cost of the antenna elements themselves. Often there is limited space for mounting the elements as well. Theory conventionally indicates that with N antenna elements, one can theoretically form N−1 nulls in independent directions of arrival to minimize interference. For example, a 3 element antenna (N=3) can form two (N−1) independent nulls to minimize interference. This is accomplished by changing the weights and phases (or alternatively changing the weights of the in-phase and quadrature components) of each antenna element output and then summing the resulting weighted element outputs together. Thus, the ability to null jammers and other sources of interference with a lower number of antenna elements is usually an advantage.

Traditionally, some GPS antenna elements receive a right hand circularly polarized signal by internally receiving two linear polarizations such as the vertical and horizontal polarization components in separate feed lines and then combining these two polarization components to output a circularly polarized signal. GPS patch elements commonly use this approach. However, this approach is costly and requires too much space for certain applications such as small (4–5 inch diameter) GPS guided projectiles. Hence, there is a need in the art for a system or method for effecting spatial nulling of GPS signals for small projectiles.

In addition, because the signal level is low (total power at the antenna is typically 120 dB below one milliwatt), the potential for interference, either inadvertent or deliberate, is great. One way to counter this interference is with an adaptive antenna designed to minimize the power from an interfering source. The adaptive antenna will tend to minimize the antenna gain in the direction of the arriving interference.

However, for an adaptive antenna, the controlling algorithm must be constrained in some way to counter the tendency for the antenna to minimize the interference by shutting off all antenna elements. This is counterproductive since the goal is to successfully receive the GPS satellite signals. A common constraint is to require one of the antenna elements be weighted to near its maximum gain state at all times at a fixed value. This thereby prevents the antenna algorithm from shutting off the desired GPS signal.

One problem with this approach is that it takes away some of the degrees of freedom for an antenna for certain interference directions. Another problem with fixing the gain of one element nearly fully on is that for some interference geometries, the desired weights are such that the reference "fixed" element weight should have less gain than one or more of the other elements. When the reference element is fixed to nearly fully on, hardware limitations prevent providing gains for the other elements that are much greater than the reference element. For these geometries, this results in loss of some of the degrees of freedom. This means that a 3 element antenna cannot do a good job of nulling two interferers for certain geometries.

Further, traditional spatial nulling systems had difficulty nulling jammers from certain combinations of movement and angles relative to the receiving elements. Accordingly, there is an additional need in the art for a system and method for improving the performance of GPS receivers with respect to jammers.

SUMMARY OF THE INVENTION

The need in the art is addressed by the teachings of the present invention. One aspect of the invention is the provision of a system and method for utilizing the vertical and horizontal polarizations of signal output by each antenna element in an array of antenna elements. This effectively doubles the number of channels from the conventional number of channels (N) to 2N. Each of these channels is uniquely weighted in accordance with conventional teachings such that the system operates with a capability to null 2N−1 jammers.

Another aspect of the invention is the provision of a system and method for moving the reference channel from one channel to another in respect to the detection of received power levels. In specific implementations, the applied weights are dithered in a predetermined direction and a predetermined amount to ascertain updated weight settings to null the interference and also when and whether to pass the reference channel designation.

BRIEF DESCRIPTION OF THE DRAWINGS

FIG. 7 is a flow diagram of the step procedure of the illustrative embodiment of the teachings of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
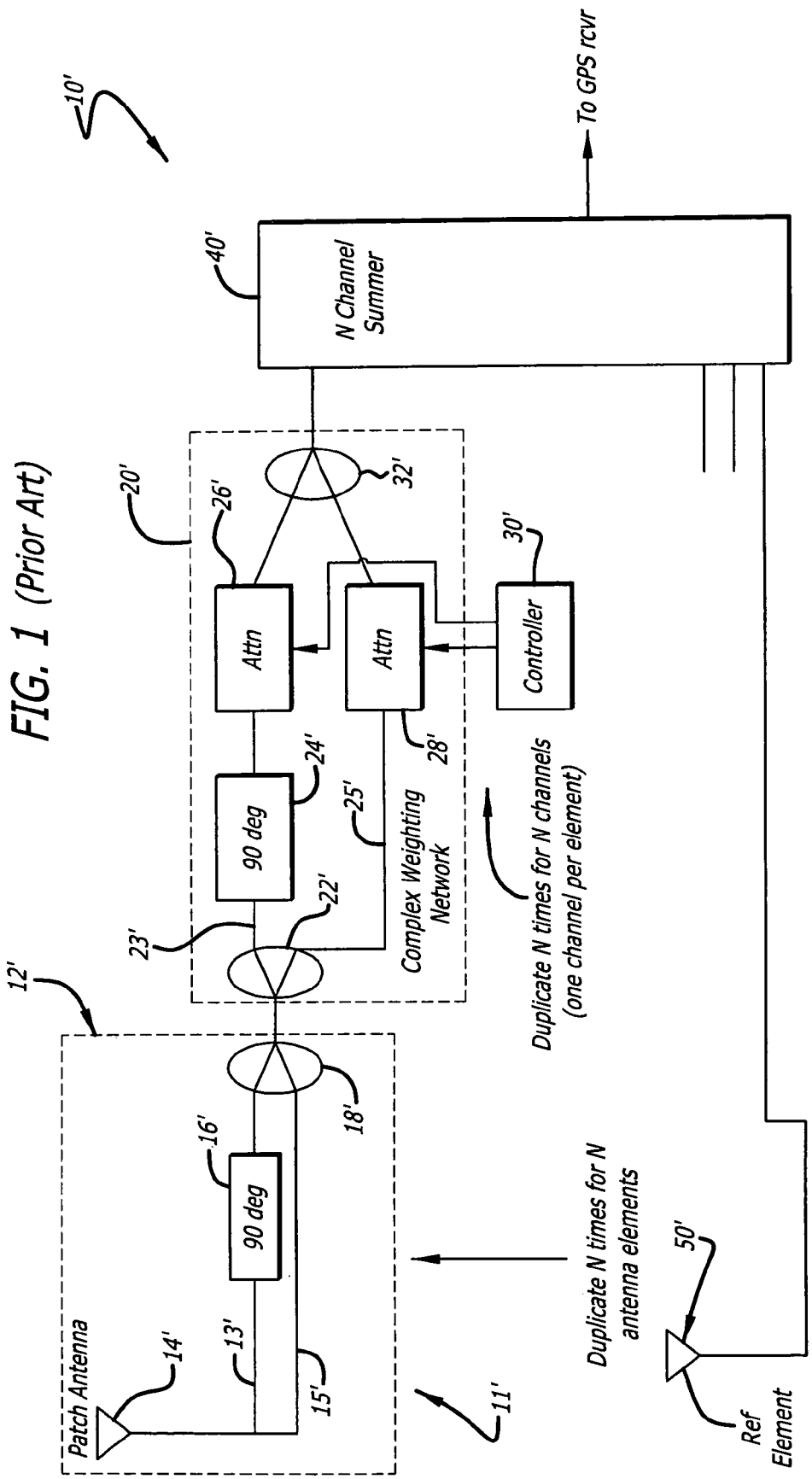
FIG. 1 is a block diagram illustrating an antenna and antijam arrangement for a GPS receiver implemented in accordance with traditional teachings.

FIG. 1 is a block diagram illustrating an antenna and antijam arrangement for a GPS receiver implemented in accordance with traditional teachings. The arrangement 10' has N channels of which one channel 11' is shown. Each channel includes an antenna module 12' and a complex weighting network 20'. Conventionally, the antenna module 12' typically includes a patch antenna element 14' which outputs a vertically polarized signal and a horizontally polarized signal on first and second output lines 13' and 15' thereof In the illustration of FIG. 1, the phase shifted signal which is shifted by a 90° phase shifter 16'. The phase shifter 16' outputs the phase shifted signal in the first path 13' which then can be combined in phase with the horizontally polarized signal in the second path 15' by a combiner 18'. The combiner 18' outputs a signal which responds optimally to the right-hand circularly polarized signal from the GPS Satellite Vehicles (SVs) is received by a splitter 22' in the weighting network 20'. In a first path 23' the output from the splitter 22' is shifted by a 90° phase shifter such that first and second variable amplifier/attenuators 26' and 28' receive in-phase (I) and quadrature (Q) components of a complex representation of the signal received from the antenna module 12'. Note that while the complex weighting of each channel is shown as having two internal paths (I) and (Q), an alternate approach is to use separate amplitude and phase controls.

The attenuators 26' and 28' adjust the gain of these signals in accordance with weights supplied by a controller 30'. The complex weighted signals are then combined by a combiner 32' and sent to a summer 40'. The summer 40' combines the outputs of all N channels of which one is a reference channel having an associated antenna 50'. The output of the summer 40' is fed to a GPS receiver (not shown).

Figure 2:
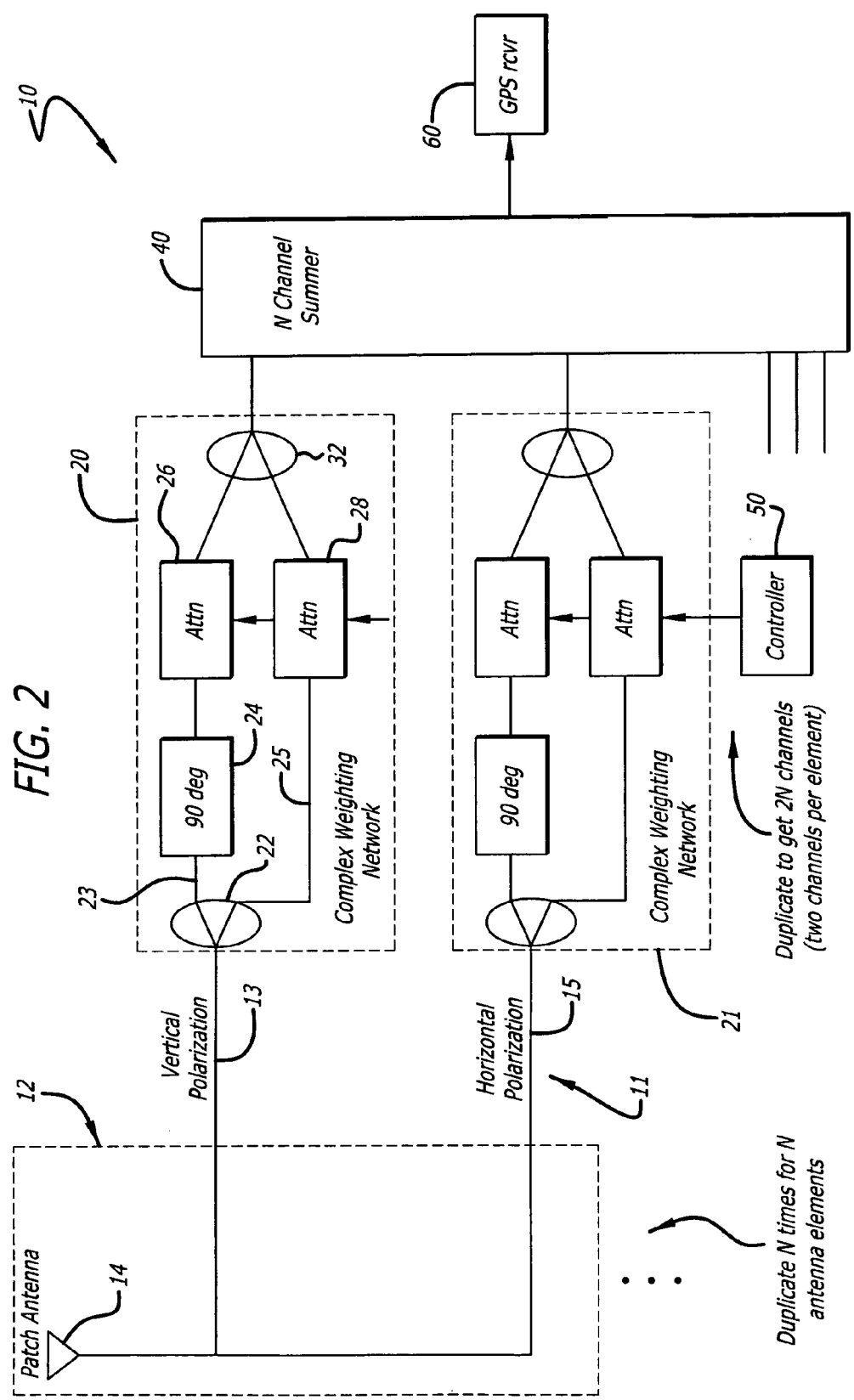
FIG. 2 is a block diagram illustrating an antenna and antijam arrangement for a GPS receiver implemented in accordance with the teachings of the present invention.

FIG. 2 is a block diagram illustrating an antenna and antijam arrangement for a GPS receiver implemented in accordance with the teachings of the present invention. Note that the inventive arrangement is similar to that of FIG. 1 with the exception that the antenna module 12' is adapted to output the vertical and horizontal components of the received signal as opposed to the single combined right-hand polarized signal output by the antenna module 12' of FIG. 1. Another distinctive feature is the provision of an additional complex weighting module 21. Thus, first and second modules are provided to individually weight the vertical and horizontally polarized signals output by the antenna 12. The weights are generated by the controller 50 to steer a null in the direction of a jammer or a source of interference in a conventional manner. For the illustrative 2N-1 implementation, the weights for the reference antenna element may be coordinated between the vertical and horizontal outputs. This allows one to provide right hand circular reception of the GPS signal. Alternately, when needed the outputs of the reference element may by controlled to provide an additional null, thereby providing the full 2N-1 nulling capability.

In the illustrative embodiment of FIG. 2, the remaining 2N-1 channels are identical to the channel 11 illustrated in FIG. 1. (As an alternative, a reference channel may be provided as per FIG. 1.) Thus, 2N channels are provided from N antenna elements. These channels are summed by the summer 40 and output to a GPS receiver 60.

Those skilled in the art will appreciate that the inventive arrangement offers the potential for a more space efficient, lower cost implementation relative to the prior art. For example, the number of antenna elements may be reduced while providing the same number of channels as per the conventional implementation shown in FIG. 1.

Figure 3:
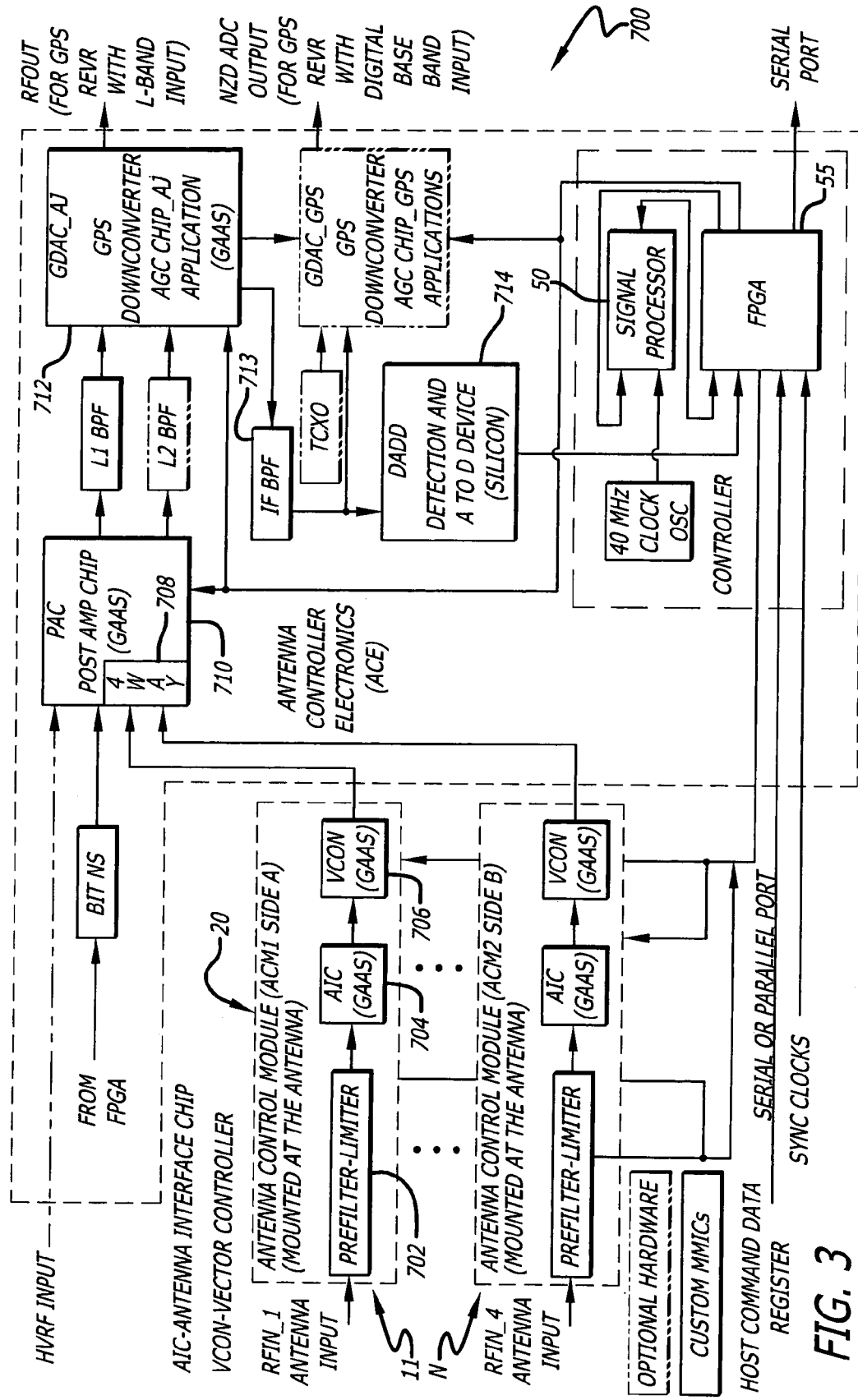
FIG. 3 is a block diagram showing a four channel (i.e., N=4) implementation of an antijam module in accordance with the present teachings in greater detail.

FIG. 3 is a block diagram showing a four channel (i.e., N=4) implementation of an antijam module in accordance with the present teachings in, greater detail. Inputs from the antennas (not shown) are labeled RFIN_1 to RFIN_4 and comprise channels 11 to N in FIG. 2. The antenna control modules implement the complex weight control modules 20 of FIG. 2. Each module 20 includes a prefilter/limiter 702, an amplifier 704 and a vector controller 706. Weights are provided to each module by a signal processor 50 via a field programmable gate array (FPGA) 55. The outputs of the modules are summed in a '4 way' section 708 of a post amplification chip 710. The summed signals are then provided to a downconverter 712 that feeds the GPS receiver 60 (not shown). The downconverted signals are filtered by a bandpass filter 713 and input to a detector and analog to digital converter 714. The detector and A/D 714 detects the received signal power, converts it to digital and feeds it to the signal processor 50 via the FPGA 55. This facilitates a detection of the jammer or interferer power to dither the module weights in a closed loop manner in accordance with the present teachings as discussed more fully below.

In the current best mode, the controller 50 of FIG. 2 is implemented in software to run on a microprocessor. As discussed more fully below, in accordance with the present teachings, the controller 50 selects one of the channels to serve as a reference channel during one time interval or set of operational conditions and then selects another channel to serve as the reference channel during another time interval or set of operational conditions and so on. In effect, the controller 50 'passes the baton' from one channel to the next to optimize antijam performance under dynamic operational conditions.

Figure 4:
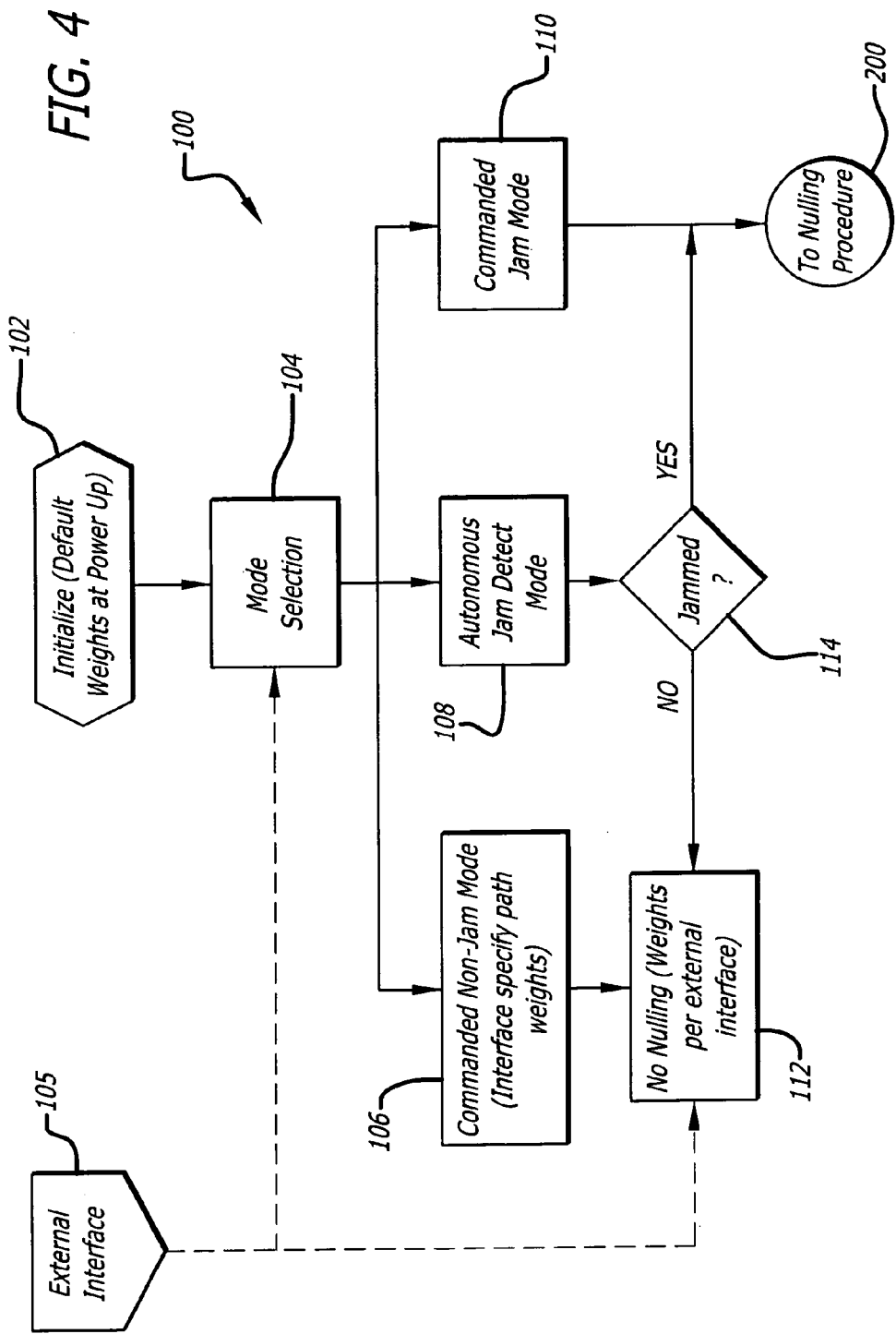
FIG. 4 is a flow diagram of an illustrative implementation of software adapted to run on the processor of the antijam module of the present invention.

As discussed more fully below, in an illustrative embodiment, one element path is designated a reference path, and its weight (either the I or Q path or both) is set to maximum voltage gain. This provides for the GPS SV signal to always be available to the GPS receiver 60. Without this reference path (or element), the power minimization algorithm would typically shut off all antenna element paths, resulting in no GPS signal to the receiver. In accordance with the present teachings, software running on the processor 50 dithers each of these non-reference path attenuators to determine whether to step them in the positive or negative voltage direction in order to minimize jammer power. Whenever one of the attenuators gets to the end of its range (either on the positive or negative voltage side), the "baton is passed" and it becomes the new reference element. The old reference element is then released so that it can dither and find a new setting which minimizes jammer power. This is illustrated more clearly with respect to FIGS. 4–10 below. FIG. 4 is a flow diagram of an illustrative implementation of software adapted to run on the processor of the antijam module of the present invention. At step 102, the software 100 initializes with a set of default weights at startup. At step 104, a mode selection by a system operator is effected via an external interface 105. In the illustrative implementation, the mode options are a command non-jam mode in which the user specifies paths weights to steer the received beam in a desired direction (step 106), an autonomous jam detect mode (step 108) and a command jam mode (step 110). In the commanded non-jam mode, the system 10 performs no nulling. Weights are supplied via the external interface 105. In the autonomous jam detect mode, the software tests for jammer or interference at step 114. Jammer detection is effectuated via the detector 714 of FIG. 3. Upon detection of a jammer at step 114 or when commanded to jam mode at step 110, the system executes a nulling procedure (200) in accordance with the present teachings.

Figure 5:
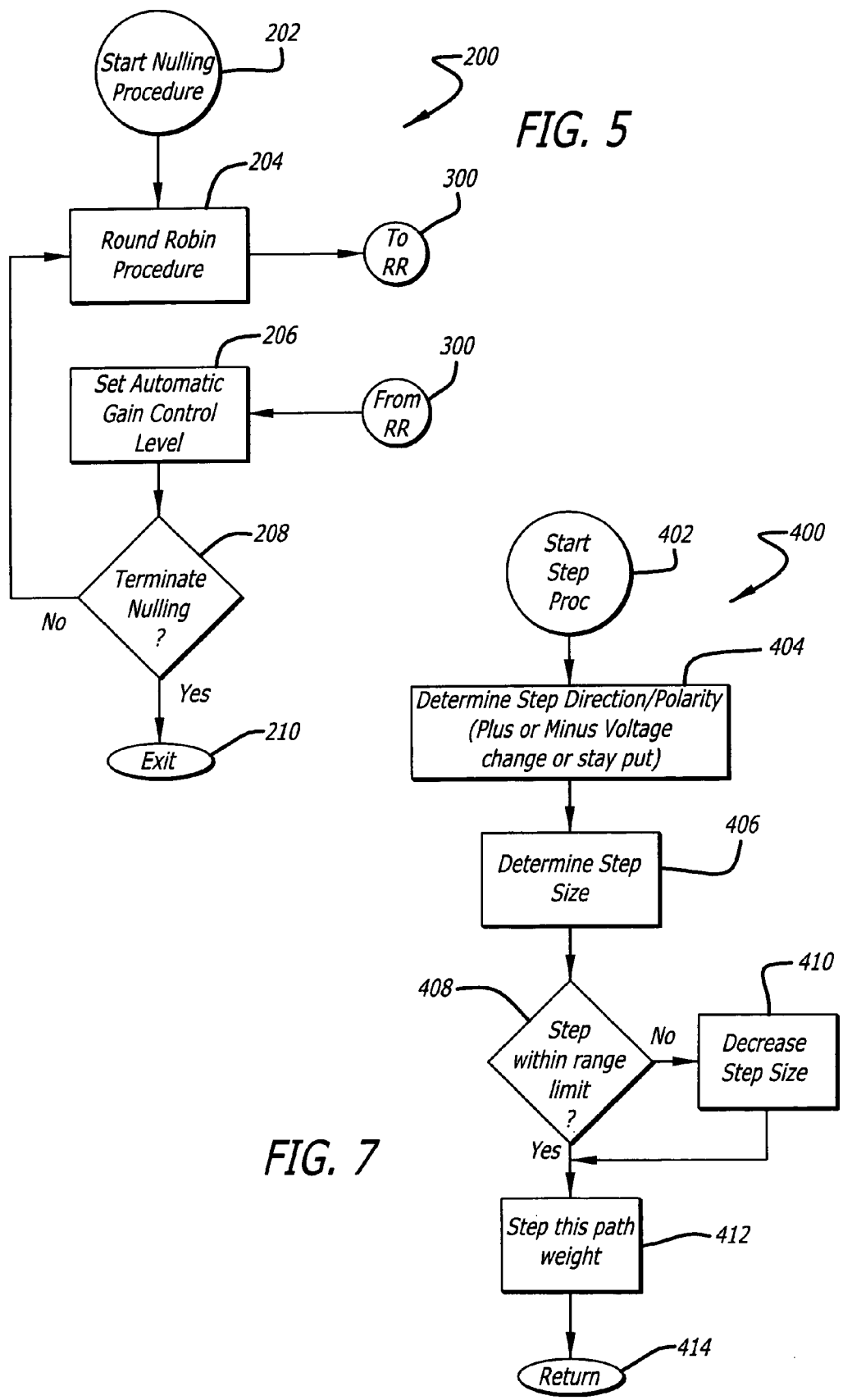
FIG. 5 is a flow diagram of an illustrative implementation of the nulling procedure in accordance with the present teachings.

FIG. 5 is a flow diagram of an illustrative implementation of the nulling procedure 200 in accordance with the present teachings. At step 204, the procedure 200 begins a round robin procedure 300. This procedure is illustrated in FIG. 6.

Figure 6:
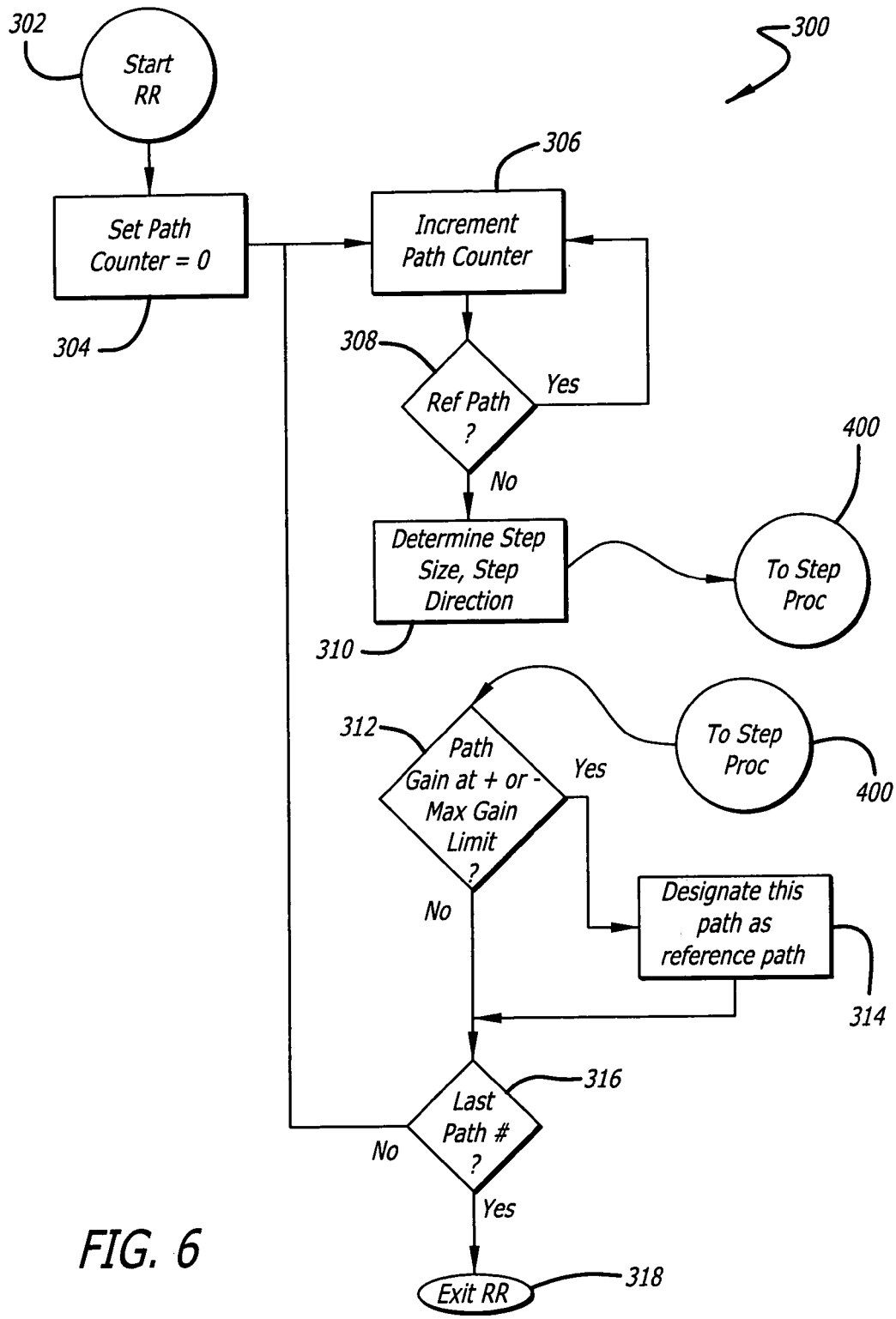
FIG. 6 is a flow diagram of an illustrative implementation of the round robin procedure of the present invention.

FIG. 6 is a flow diagram of an illustrative implementation of the round robin procedure of the present invention. The procedure 300 begins at step 304 with a setting of a path counter at '0'. At step 306, the path counter is incremented. At step 308, a check is made to determine if the path is the reference path. If so, it loops back to step 306 to increment the counter. If not, at step 310, it increments the step size and step direction via a step procedure 400.

FIG. 7 is a flow diagram of the step procedure of the illustrative embodiment of the teachings of the present invention. As illustrated in FIG. 7, at step 404, the procedure 400 determines the step direction or polarity. At step 406, the step size is determined. At step 408, the procedure determines if the step range is within a predetermined range limit. The range limit is stored in the software to correspond with the hardware setting limits of the vector controller 706. If not, the step size is decreased (step 410), if so or thereafter, the path weight is stepped. Then the procedure returns to FIG. 6.

On return from the step procedure, at step 312, the procedure 300 checks to see if the system is at the path gain limit (+ or − maximum possible gain). If so, the path is designated as the new reference path, i.e., the 'baton' is passed. Then the system checks to see if the path is the last path (step 316). If not, it loops back to step 306. Otherwise, it exits the round robin procedure and returns to step 206 of the nulling procedure 200 to set the automatic gain control level. At step 208, the procedure 200 checks to determine whether the nulling procedure should be terminated. If so, it exits. If not, it returns to step 204 to the round robin procedure 300.

Figure 8:
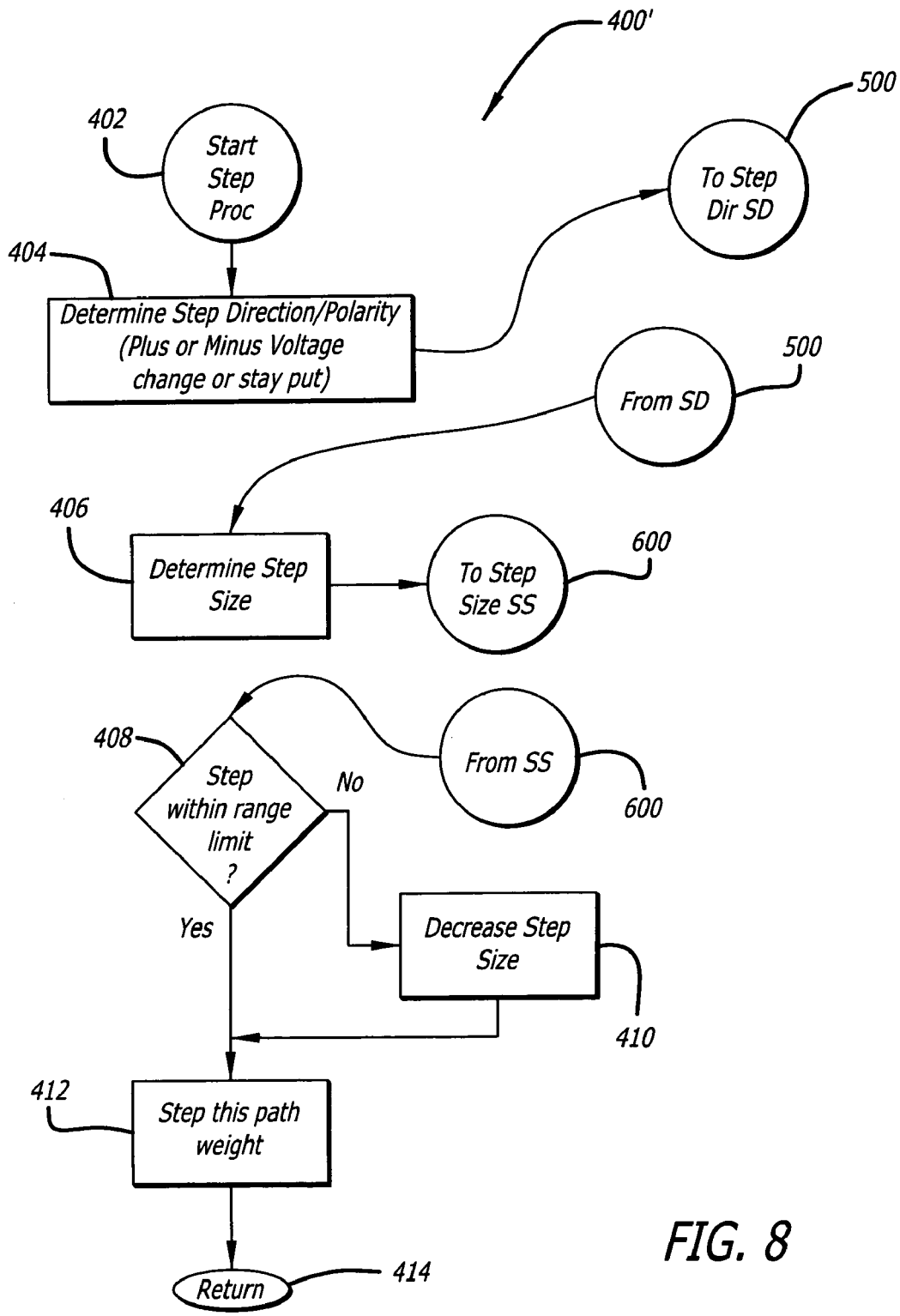
FIG. 8 shows an alternative embodiment of the step procedure of the present invention.

FIG. 8 shows an alternative embodiment of the step procedure of the present invention. This procedure 400' differs from that shown in FIG. 7. In this embodiment, at step 404 the procedure 400' executes a routine 500 to determine the step direction. This procedure is illustrated in FIG. 9.

Figure 9:
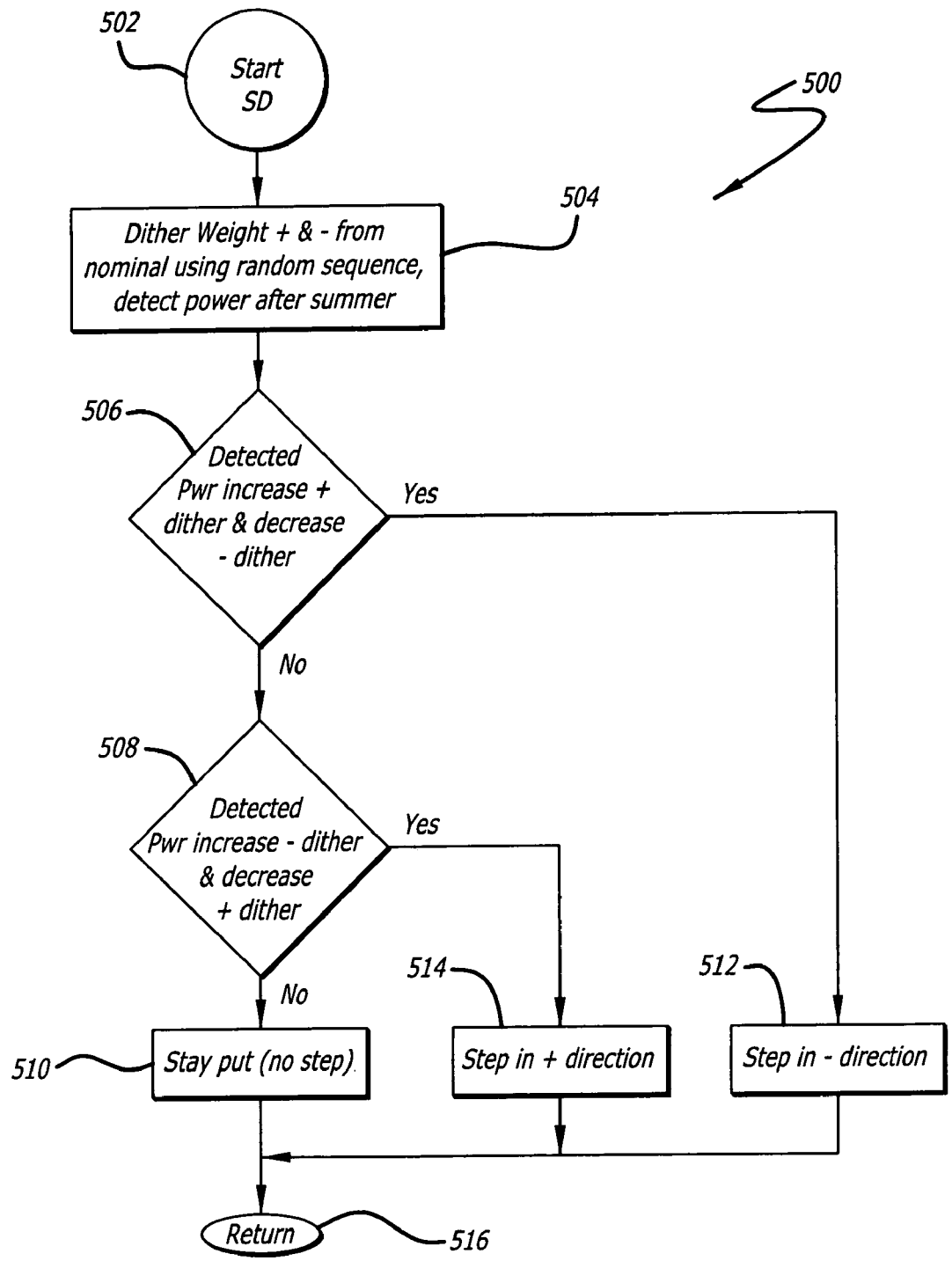
FIG. 9 is a flow diagram of an illustrative implementation of a routine for determining step direction in accordance with the teachings of the present invention.

FIG. 9 is a flow diagram of an illustrative implementation of a routine for determining step direction in accordance with the teachings of the present invention. The routine 500 includes a step 504 at which the weight is dithered in the positive or negative direction from nominal using a random sequence. At steps 506 and 508 the power of the jammer or interferer is detected. If at step 506, the detected power increased as a result of a dither in the positive direction and also decreased for dither in the negative direction, then the routine sets the step direction as negative at step 512. On the contrary, if at step 508, the detected power decreased as a result of a dither in the positive direction and also increased for dither in the negative direction, the step direction is set as positive in step 514. If the detected power either increased for dither in both the positive and negative directions, or if it decreased for dither in both directions, then no step is taken (step 510) and the routine returns to FIG. 8 at step 516. In FIG. 8, at step 406, the routine 400' determines step size. This routine is illustrated in FIG. 10.

Figure 10:
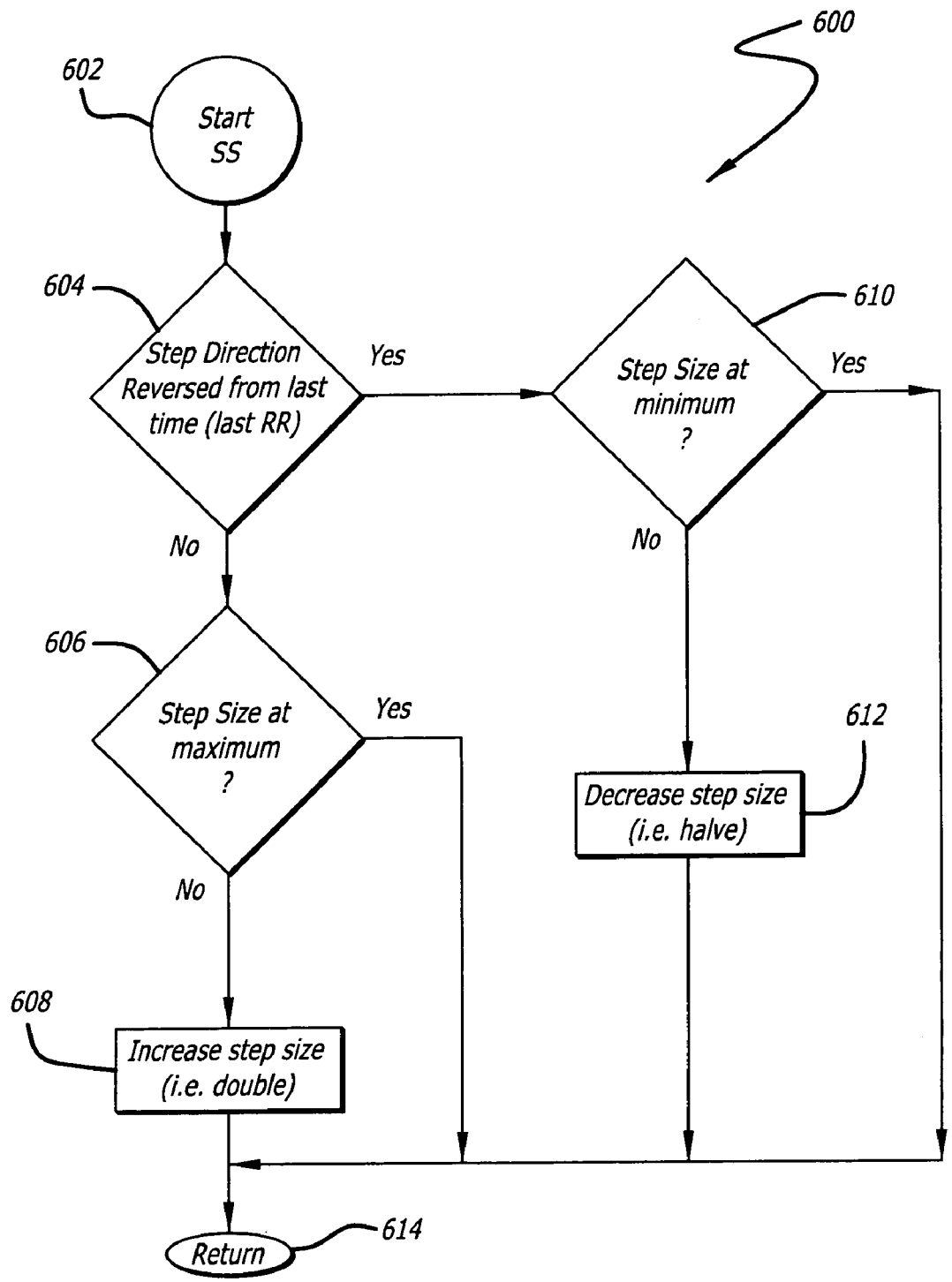
FIG. 10 is a flow diagram of an illustrative implementation of a routine for determining step size in accordance with the teachings of the present invention.

FIG. 10 is a flow diagram of an illustrative implementation of a routine for determining step size in accordance with the teachings of the present invention. The routine 600 begins with a determination at step 604 as to whether the step direction is reversed from the last round robin. If the result is negative, then at step 606, the routine tests for whether the step size is at a maximum. If so, the routine ends. If not, the step size is increased (e.g. doubled) at step 608 and then the routine ends at step 614. If at step 604 the step direction is determined to have reversed since the last round robin, then at step 610, the routine checks to determine if the step size is at a minimum. If so, the routine returns at step 614. If not, the step size is decreased (e.g. halved) at step 612 and the routine subsequently returns at step 614. When the routine 600 ends at step 614, it returns to step 408 of the routine 400' of FIG. 8.

The routine 400' of FIG. 8 is otherwise identical to the routine 400 of FIG. 7. Those skilled in the art will appreciate that if the jammer null drives an element to its limit, it is designated as the baton and the other elements are adjusted from there. The controller 30 changes the magnitude and phase of the elements to cancel out the signal the reference element is receiving. This effectively steers the beam to minimize jammer power.

Thus, in accordance with the present teachings, an arbitrary element weight is designated the reference weight upon power up. This weight is constrained to be nearly fully on. It would probably be fully on except for algorithms which dither the weights to gather data to calculate the next weight settings and in some cases it is desirable to leave room for dithering about this reference level. This reference weight can be thought of as having the "baton". This element keeps on being the reference (keeps the baton) until the control algorithm starts driving another element weight path up to the absolute value of the reference gain amplitude setting (i.e. without regard to whether the voltage gains in the vector controller is positive or negative in polarity). When one of the other elements gets to the reference gain setting, it takes the baton from the reference element and becomes the new reference element. The old reference element is then no longer constrained (no longer has the baton) and becomes one of the variable weights—it is no longer fixed.

The baton gets passed back and forth indefinitely. There is no fixed sequence or restrictions on passing the baton. The only criteria is that any element weight that is not presently a reference weight which gets up to the reference setting, is given the baton. If more than one weight gets to the reference setting simultaneously, the baton can be passed to any of the qualifying candidates such that eventually all the qualifying candidates have been passed to. In the end, the optimum solution will almost always have one maximum weight setting, and this weight will have the baton or reference designation. If one finds a pathological situation where the optimum solution has two equal maximum gain weights, then there is no harm in continuously passing the baton back and forth between them. The resulting optimal weight setting solution is still allowed in the hardware weights.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A circuit comprising:
   first and second antenna elements;
   first and second channels coupled to said first and second antenna elements respectively; and
   means for selecting said first or said second channel as a reference channel in response to a predetermined set of operational conditions, said means for selecting including means for passing a baton on said predetermined set of operational conditions and said baton being a weight applied to a signal received by said first or said second antenna element such that a parameter for a path is substantially equal to a predetermined parameter limit.

2. The invention of claim 1 wherein said parameter is gain and said means for selecting includes means for determining if a path is at a path gain limit.

3. The invention of claim 2 wherein said means for passing a baton includes means for detecting a power level of signals received by said first and said second antennas.

4. The invention of claim 3 wherein said means for passing the baton includes means for dithering said weights in response to said means for detecting power.

5. The invention of claim 4 wherein said means for dithering includes means for determining step direction.

6. The invention of claim 5 wherein said means for dithering includes means for determining step size.

7. A method for selecting a reference channel including the steps of:
   receiving signals using first and second antenna elements coupled to first and second channels respectively;
   selecting said first channel as the reference channel during a first set of operational conditions and
   selecting said second channel as the reference channel during a second set of operational conditions, said step of selecting further including the step of passing a baton on said predetermined set of operational conditions and said baton being a weight applied to a signal received by said first or said second antenna element such that a parameter for a path is substantially equal to a predetermined parameter limit.

* * * * *